United States Patent
Pavithran et al.

(10) Patent No.: US 8,858,100 B2
(45) Date of Patent: *Oct. 14, 2014

(54) AUTO FOCUS-ZOOM ACTUATOR OR CAMERA MODULE CONTAMINATION REDUCTION FEATURE WITH INTEGRATED PROTECTIVE MEMBRANE

(71) Applicant: DigitalOptics Corporation, San Jose, CA (US)

(72) Inventors: Prebesh Pavithran, Bukit Mertajam (MY); Yeow Thiam Ooi, Butterworth (MY); Haw Chyn Cheng, Butterworth (MY); Hung Khin Wong, Ipoh (MY)

(73) Assignee: DigitalOptics Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/040,080

(22) Filed: Sep. 27, 2013

(65) Prior Publication Data

US 2014/0028898 A1  Jan. 30, 2014

Related U.S. Application Data

(63) Continuation of application No. 13/046,563, filed on Mar. 11, 2011, now Pat. No. 8,545,114.

(51) Int. Cl.
| | |
|---|---|
| *G03B 3/00* | (2006.01) |
| *G03B 13/00* | (2006.01) |
| *H04N 5/225* | (2006.01) |
| *H04N 5/232* | (2006.01) |
| *H04N 5/262* | (2006.01) |
| *G02B 7/10* | (2006.01) |
| *G03B 5/00* | (2006.01) |
| *G02B 27/00* | (2006.01) |
| *G03B 3/10* | (2006.01) |
| *G03B 17/08* | (2006.01) |

(52) U.S. Cl.
CPC ............ *G02B 27/0006* (2013.01); *G02B 7/102* (2013.01); *G03B 5/00* (2013.01); *G03B 3/10* (2013.01); *G03B 17/08* (2013.01); *H04N 5/2253* (2013.01); *H04N 5/2257* (2013.01)

USPC ............... 396/448; 396/85; 396/89; 396/529; 348/240.99; 348/340; 348/345

(58) Field of Classification Search
USPC .............. 396/89, 349, 529, 85; 359/507, 513, 359/819, 826, 823; 348/340, 240.99, 345
See application file for complete search history.

(56) References Cited

U.S. PATENT DOCUMENTS

| | | | |
|---|---|---|---|
| 6,137,691 A | 10/2000 | Jang | |
| 8,545,114 B2 * | 10/2013 | Pavithran et al. | ............. 396/448 |
| 2004/0021792 A1 | 2/2004 | Yasui | |
| 2004/0132491 A1 | 7/2004 | Kim et al. | |

(Continued)

FOREIGN PATENT DOCUMENTS

| | | |
|---|---|---|
| CN | 1220573 A | 6/1999 |
| CN | 1479506 A | 3/2004 |

(Continued)

OTHER PUBLICATIONS

U.S. Appl. No. 13/149,638, Office Action dated Jul. 16, 2014.

(Continued)

*Primary Examiner* — Rochelle-Ann J Blackman

(74) *Attorney, Agent, or Firm* — Larry E. Henneman, Jr.; Gregory P. Gibson; Henneman & Associates, PLC

(57) ABSTRACT

A camera module includes a lens system, an image sensor, and an actuator. The actuator is fixed relative to the image sensor, and the actuator moves the lens system relative to the image sensor to achieve focus. Components that move relative to each other result in gaps or spaces between the components, an in particular there is a gap between the lens system and the actuator. Such a gap provides a traveling path for foreign material, or particulates, to enter the camera module and reach the image sensor, or other intermediate optical components between the lens system and the image sensor. A camera contamination reduction apparatus is implemented as a protective membrane that prevents foreign material from reaching the internal optical components through the traveling path.

26 Claims, 6 Drawing Sheets

(56) References Cited

U.S. PATENT DOCUMENTS

| | | |
|---|---|---|
| 2004/0150891 A1* | 8/2004 | Ichino .......................... 359/704 |
| 2007/0146145 A1 | 6/2007 | Lehrman et al. |
| 2008/0054934 A1 | 3/2008 | Jungert |
| 2008/0055438 A1 | 3/2008 | Lee et al. |
| 2008/0267617 A1 | 10/2008 | Huang et al. |
| 2012/0140101 A1 | 6/2012 | Afshari et al. |

FOREIGN PATENT DOCUMENTS

| | | |
|---|---|---|
| CN | 1518384 A | 8/2004 |
| JP | 2004-274164 A | 9/2004 |
| JP | 2007-041419 A | 2/2007 |

OTHER PUBLICATIONS

U.S. Appl. no. 13/404,838, Office Action dated Jun. 23, 2014.

CN Patent Application Serial No. 201080060668.5, Office Action dated Jun. 27, 2014 (English translation).

EP Patent Application Serial No. 10828667.5, European Search Report dated Jul. 16, 2014.

\* cited by examiner

AUTO FOCUS-ZOOM ACTUATOR OR CAMERA MODULE CONTAMINATION REDUCTION FEATURE WITH INTEGRATED PROTECTIVE MEMBRANE

RELATED APPLICATIONS

This application is a continuation of U.S. patent application Ser. No. 13/046,563 (now U.S. Pat. No. 8,545,114) entitled "Auto Focus-Zoom Actuator or Camera Module Contamination Reduction Feature With Integrated Protective Membrane" filed Mar. 11, 2011 by the same inventors, which is incorporated herein by reference in its entirety.

BACKGROUND OF THE INVENTION

1. Field of the Invention

The invention relates to imaging devices. More particularly, the invention relates to an auto focus-zoom actuator or camera module contamination reduction feature with integrated protective membrane.

2. Background of the Invention

Recently, there have been numerous developments in digital camera technology. One such development is the further miniaturization of optical and mechanical parts to the millimeter and sub millimeter dimensions. The shrinkage in the moving parts of cameras has allowed the implementation of modern digital camera and optical technology into a broader range of devices. These devices are also constantly being designed and constructed into smaller and smaller form factor embodiments. For example, these days typical personal electronic devices such as cellular phones, personal digital assistants (PDAs), and wrist and/or pocket watches include a miniature digital camera. To protect against foreign material intrusion, a gasket is added during the phone level assembly. However, such gaskets are only effective for cameras utilizing fixed position lenses.

Auto-focusing and zoom camera features function in part by adjusting a relative distance between one or more lenses and an image sensor. In either case, actuators are used to move the lenses. Enabling moving components within the camera introduces undesirable pathways through which foreign particles can enter the camera and possible reach sensitive internal optical components, such as the image sensor of filters, within the camera. Particles on the optical components negatively impacts the effectiveness of the image capturing functionality. Gaskets used in cameras with fixed position lenses are ineffective when moving lenses and actuators are used. Further, any introduction of a gasket-like feature may increase the size of the camera module, which counters the goal of miniaturization, and also runs the risk of impacting actuator characteristics and performance.

SUMMARY OF THE INVENTION

A camera module includes a lens system, an image sensor, and an actuator. The actuator is fixed relative to the image sensor, and the actuator moves the lens system relative to the image sensor to achieve focus. Components that move relative to each other result in gaps or spaces between the components, an in particular there is a gap between the lens system and the actuator. Such a gap provides a traveling path for foreign material, or particulates, to enter the camera module and reach the image sensor, or other intermediate optical components between the lens system and the image sensor. A camera contamination reduction apparatus is implemented as a protective membrane that prevents foreign material from reaching the internal optical components through the traveling path.

In an aspect, an imaging device is disclosed. The imaging device includes a lens system; an image sensor aligned to receive light from the lens system; an actuator system coupled to the lens system and to the image sensor, wherein the actuator system is configured to move the lens system relative to the image sensor; and a protective membrane coupled to the lens system and to the actuator system, wherein the protective membrane is configured to filter particulates, further wherein the protective membrane is configured to be expandable and contractible to accommodate movement of the lens system relative to the actuator system. The actuator system is configured to move the lens system relative to the image sensor and to the actuator system, and the protective membrane is configured to accommodate movement of the lens system relative to the image sensor and the actuator system. The lens system has a first surface and the actuator system includes an opening aligned with the first surface such that the first surface is exposed to an external environment. In some embodiments, the protective membrane is positioned to filter particulates entering through the opening of the actuator system. In this embodiment, the protective membrane is coupled to the actuator system around the opening of the actuator system and the protective membrane is coupled to the first surface of the lens system. The actuator system includes actuating components that form a traveling path for particulates through the actuator system, and the protective membrane is positioned to intersect and filter the traveling path. In some embodiments, the actuator system further comprises an actuator support structure onto which the actuating components are mounted and the lens system further comprises a second surface opposite the first surface, the actuator support structure includes an opening aligned with the second surface of the lens system such that the second surface is exposed to the image sensor. In some embodiments, the protective membrane is coupled to the actuator system around the opening of the actuator support structure, and the protective membrane is coupled to the second surface of the lens system. In some embodiments, the imaging device includes two or more protective membranes, a first protective membrane coupled to the actuator system around the opening of the actuator system and to the first surface of the lens system, a second membrane coupled around the opening of the actuator support structure and to the second surface of the lens system.

In some embodiments, the imaging device also includes a substrate coupled between the actuator system and the image sensor, wherein the substrate includes a recessed portion within which the image sensor is positioned. In some embodiments, the imaging device also includes a light filter coupled to the substrate and positioned between the lens system and the image sensor, wherein the protective membrane is positioned to filter particulates before the particulates reach the light filter. In some embodiments, the protective membrane is a porous material. In some embodiments, the protective membrane is an elastic material. In some embodiments, the protective membrane is configured according to a zig-zag profile. In some embodiments, the imaging device is an auto-focusing camera, a zoom-enabled camera, or an auto-focusing and zoom-enabled camera.

In another aspect, an auto-focusing camera module is disclosed. The autofocusing camera module includes a lens system including a first end and a second end; an image sensor aligned to receive light from the second end of the lens system; a substrate comprising a recessed portion which the image sensor is positioned; an actuator system coupled to the lens system and to the substrate, wherein the actuator system includes an external opening aligned with the first end of the lens system such that the first end is exposed to an external environment to receive input light, further wherein the actuator system comprises one or more actuating components configured to move the lens system relative to the image sensor and to the actuator system, further wherein particulate traveling paths are formed between the one or more actuating components and between the lens system and the one or more actuating components, the particulate traveling paths extend from the external opening of the actuator system to the image sensor; and a protective membrane coupled around a perimeter of the first end of the lens system and coupled around the external opening of the actuator system, wherein the protective membrane is configured to filter particulates entering through the external opening, further wherein the protective membrane is configured to be expandable and contractible to accommodate movement of the lens system relative to the actuator system.

In yet another aspect, another auto-focusing camera module is disclosed. The auto-focusing camera module includes a lens system including a first end and a second end; an image sensor aligned to receive light from the second end of the lens system; a substrate comprising a recessed portion which the image sensor is positioned; an actuator system coupled to the lens system and to the substrate, wherein the actuator system includes an external opening aligned with the first end of the lens system such that the first end is exposed to an external environment to receive input light, further wherein the actuator system comprises one or more actuating components configured to move the lens system relative to the image sensor and to the actuator system, further wherein particulate traveling paths are formed between the one or more actuating components and between the lens system and the one or more actuating components, the particulate traveling paths extend from the external opening of the actuator system to the image sensor, wherein the actuator system further comprises an actuator support structure onto which the one or more actuating components are mounted, the actuator support structure includes an opening aligned with the second end of the lens system such that the second end is exposed to the image sensor; and a protective membrane coupled around a perimeter of the second end of the lens system and coupled around the opening of the actuator support structure, wherein the protective membrane is configured to filter particulates passing through the one or more traveling paths, further wherein the protective membrane is configured to be expandable and contractible to accommodate movement of the lens system relative to the actuator system.

These and other advantages will become apparent to those of ordinary skill in the art after having read the following detailed description of the embodiments which are illustrated in the various drawings and figures.

BRIEF DESCRIPTION OF THE DRAWINGS

The accompanying drawings, which are incorporated in and form a part of this specification, illustrate embodiments of the camera contamination reduction apparatus and, together with the description, serve to explain the principles of the camera contamination reduction apparatus, but not limit the invention to the disclosed examples.

DETAILED DESCRIPTION OF THE PRESENT INVENTION

Figure 1:
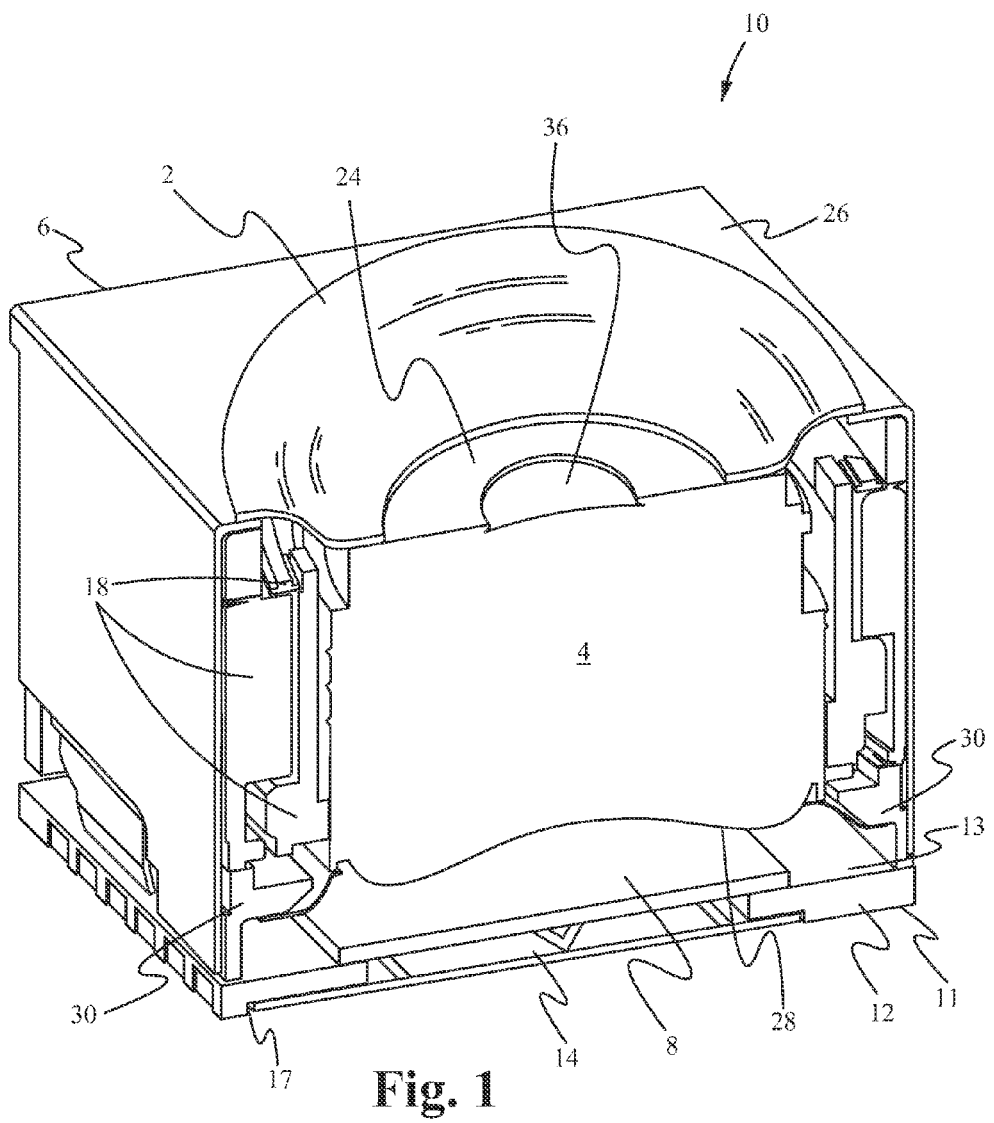
FIG. 1 illustrates a cut-out isometric view of an exemplary camera module including a camera contamination reduction apparatus according to an embodiment.

Embodiments of the present application are directed to a camera contamination reduction apparatus. Those of ordinary skill in the art will realize that the following detailed description of the camera contamination reduction apparatus is illustrative only and is not intended to be in any way limiting. Other embodiments of the camera contamination reduction apparatus will readily suggest themselves to such skilled persons having the benefit of this disclosure.

Reference will now be made in detail to implementations of the camera contamination reduction apparatus as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The camera contamination reduction apparatus provides a packaging solution with a dust-reducing, if not dust-proof, actuator component. A protective membrane is attached to or integrated with the actuator, which is part of a complete camera module. The camera contamination reduction apparatus reduces, if not eliminates, foreign material from reaching internal image sensing or other optically sensitive components. Reducing contaminants results in improved optical/image capturing performance. The camera contamination reduction apparatus provides improved foreign material control during assembly processes and transportation. In some applications where the camera module is included within another device, such as a camera phone, the camera contamination reduction apparatus provides improved foreign material control during device level assembly. In general, reducing contaminants improves manufacturing yield since there are less rejections caused by foreign material contamination near to or on the image sensor.

A camera module includes a lens system, an image sensor, and an actuator. The actuator is fixed relative to the image sensor, and the actuator moves the lens system relative to the image sensor to achieve focus. Components that move relative to each other result in gaps or spaces between the components, an in particular there is a gap between the lens system and the actuator. Such a gap provides a traveling path for foreign material, or particulates, to enter the camera module and reach the image sensor, or other intermediate optical components between the lens system and the image sensor. A camera contamination reduction apparatus is implemented as a protective membrane that prevents foreign material from reaching the internal optical components through the traveling path. In some embodiments, the protective membrane is added at the entrance of the traveling path to reduce/prevent foreign material from entering the camera module. In other embodiments, the protective membrane is added at some internal portion of the traveling path sufficient for reducing/preventing foreign material from reaching the image sensor and/or intermediate optical components. In still other embodiments, multiple protective membranes are added. For example, one protective membrane is positioned at the entrance of the traveling path and at least one protective membrane is positioned at some internal portion of the traveling path.

Integrating the protective membrane with the actuator avoids an increase in the camera module size, in terms of Z-height, without sacrificing the form-fit factor. The use of the integrated protective membrane also eliminates the need for additional gaskets when the camera module is included within a larger device, such as a camera phone.

Figure 2:
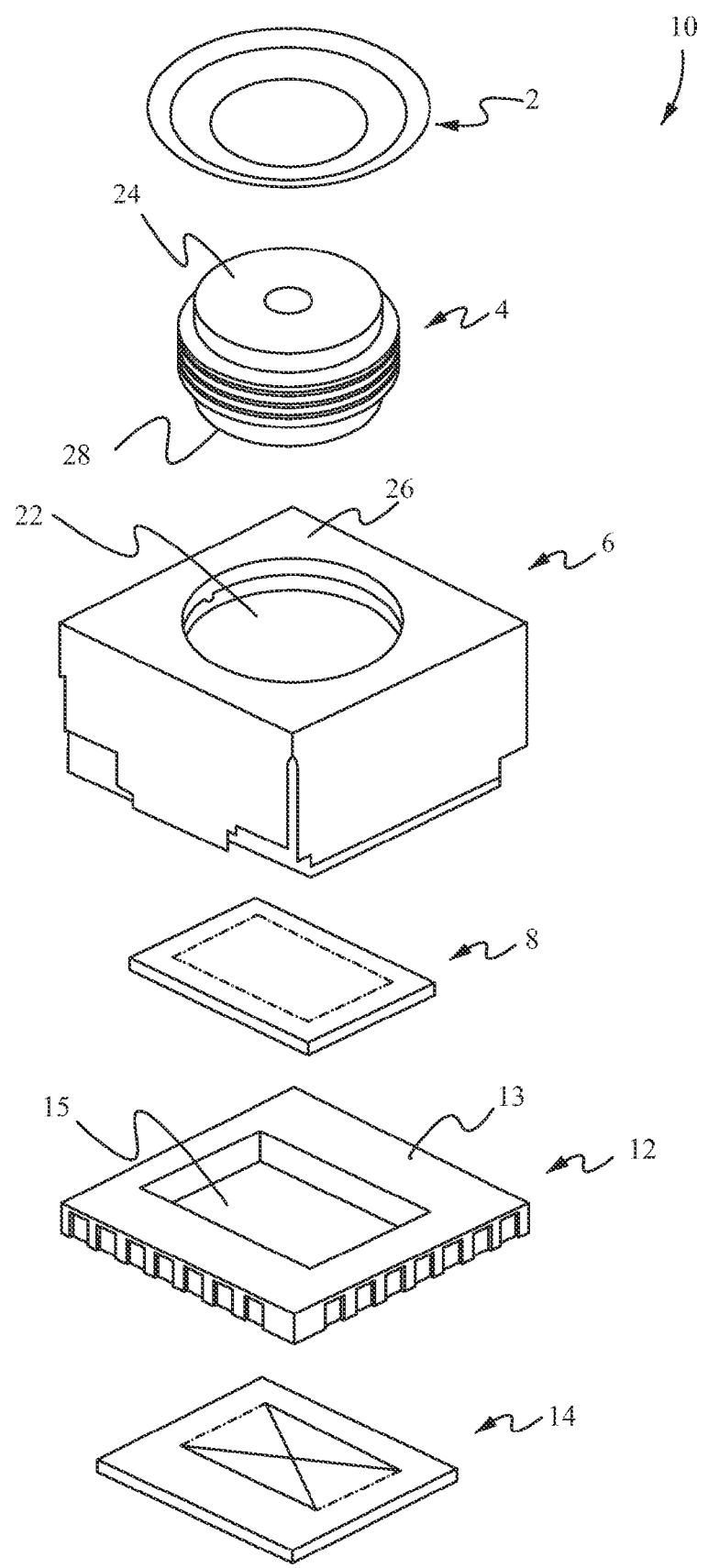
FIG. 2 illustrates an exploded view of the camera module of FIG. 1.

FIG. 1 illustrates a cut-out isometric view of an exemplary camera module including a camera contamination reduction apparatus according to an embodiment. A camera module 10 includes a protective membrane 2, a lens system 4, an actuator system 6, a substrate 12, and an image sensor 14. FIG. 2 illustrates an exploded view of the camera module 10. The actuator system 6 includes a through-hole into which the lens system 4 is positioned. A first end 24 of the lens system 4 is proximate a first opening 22 in a surface 26 of the actuator 6. The first end 24 of the lens system 4 faces external the camera module 10 to capture an external image. The actuator system 6 is coupled to a surface 13 of the substrate 12. In some embodiments, a surface 11 of the substrate 12 includes a recessed area 17 into which the image sensor 14 is positioned. The recessed area 17 functions to properly align and secure the image sensor 14. The substrate 12 includes a through-hole 15 extending from the surface 11 through the surface 13. A second end 28 of the lens system 4 is aligned with the through-hole 15 and the image sensor 14.

In some embodiments, the camera module 10 also includes one or more filters positioned between the lens system 4 and the image sensor 14. In the exemplary configuration shown in FIG. 1, a single infrared (IR) cut filter 8 is included in the camera module 10. The filter 8 is coupled to the surface 13 of the substrate 12 and aligned over through-hole 15. In some embodiments, the filter 8 is stacked on top of the surface 13, as shown in FIG. 1. The filter 8 can be secured to the surface 13 using any conventional securing means including, but not limited to, a clip, a snap fit, an interlocking channel, a screw, or an adhesive. In other embodiments, the surface 13 includes a recessed area into which the filter 8 is positioned. The recessed area functions to properly align and secure the filter 8.

The actuator system 6 is configured to move the lens system 4 relative to both the actuator system 6 and the image sensor 14. The actuator system 6 includes actuating components 18, which are coupled to the lens system 4 to move the lens system 4 up and down, referred to as the z-direction, within the through-hole of the actuator system 6. For example, the actuator system 6 can move the lens system 4 in a first direction such that the first end 24 of the lens system 4 moves toward the opening 22 in the actuator system 6 and the second end 28 moves away from the image sensor 14, and the actuator system 6 can move the lens system 4 in a second direction such that the first end 24 of the lens system 4 moves away from the opening 22 and the second end 28 moves toward the image sensor 14. In some embodiments, the actuator system 6 includes one or more supports 30. The supports 30 providing a structure onto which one or more of the actuating components are mounted. The supports 30 also provide a structure for the actuator system 6 to be coupled to the substrate 12.

Figure 3:
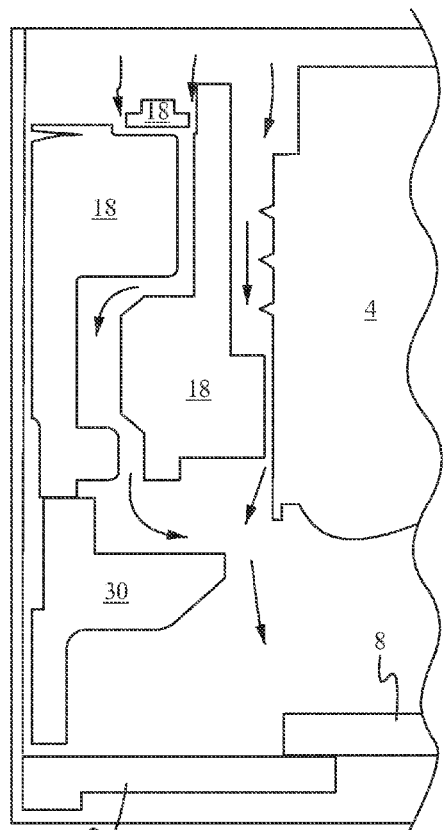
FIG. 3 illustrates a cut-out side view an exemplary interface between the actuator components and the lens system of FIG. 1.

Enabling movement of the lens system 4 within the through-hole of the actuator system 6 results in gaps between the lens system 4 and the various actuating components 18, as well as gaps between the individual actuating components 18. The gaps form pathways for foreign material to enter the camera module and/or to reach the sensitive optical components within the camera module, such as the image sensor 14 and the filter 8. FIG. 3 illustrates a cut-out side view an exemplary interface between the actuator components 18 and the lens system 4 of FIG. 1. In this exemplary configuration, the physical configuration of the moving actuator components 18 of the actuator system 6 and the lens system 4 form traveling paths, indicated by the arrows, through which foreign material can enter the camera module 10. Unencumbered, the foreign materials enter through the opening 22 of the actuator system 6 and traverse one of the traveling paths to reach the filter 8 and/or the image sensor 14. FIG. 3 shows the exemplary traveling paths without protection. In the camera module 10 of FIGS. 1 and 2, the protective membrane 2 is positioned at the entrance of the traveling paths so as to reduce, if not prevent, foreign material from entering the camera module.

Figure 4:
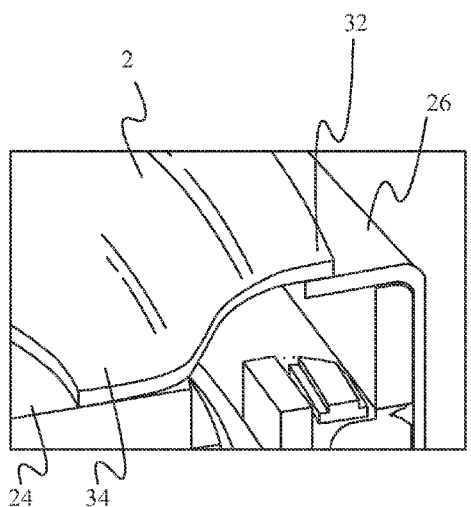
FIG. 4 illustrates a magnified portion of the interface between the protective membrane, the actuator system, and the lens system of FIG. 1.

The protective membrane 2 shown in FIG. 1 is positioned at an entrance of the traveling paths. The protective membrane 2 covers the circumference gap between the first end 24 of the lens system 4 and the surface 26 of the actuator system 6. FIG. 4 illustrates a magnified portion of the interface between the protective membrane 2, the actuator system 6, and the lens system 4 of FIG. 1. In particular, an outer portion 32 of the protective membrane 2 is coupled to the surface 26 of the actuator system 6 that surrounds the opening 22. An inner portion 34 of the protective membrane 2 is coupled to the first end 24 of the lens system 4. As shown in FIG. 4, the outer portion 32 of the protective membrane 2 overlaps a portion of the surface 26 of the actuator system 6, and the inner portion 34 of the protective membrane 2 overlaps a portion of the first end 24 of the lens system 4 so as to substantially block access to the traveling paths through the camera module 10. The inner portion 34 does not cover any portion of a lens exposed at the first end 24 of the lens system 4, such as the lens 36 shown in FIG. 1.

The protective membrane 2 can be removably or permanently coupled to the surface 26 and to the first end 24. As shown in FIG. 4, the outer portion 32 of the protective membrane 2 overlays the surface 26, and the inner portion of the protective membrane 2 overlays a top surface of the first end 24. In alternative configurations, the outer portion 32 can be coupled to the underside of the surface 26 such that the surface 26 conceptually overlays the outer portion 32. Similarly, the inner portion 34 can be coupled to a side surface of the lens system 4. The outer portion 32 can be coupled to a surface of the actuator system 6 and the inner portion 34 can be coupled to a surface of the lens system 4 using any conventional method including, but not limited to, adhesives, clips, clamps, and screws. An edge of the protective membrane and an edge of the actuator system 6 at the opening 22 can be configured as tongue and groove. For example, the edge of the outer portion 32 and/or the edge of the inner portion 34 can be configured with a groove to accept an edge on the surface 26 and/or the first end 24, respectively.

Figure 5:
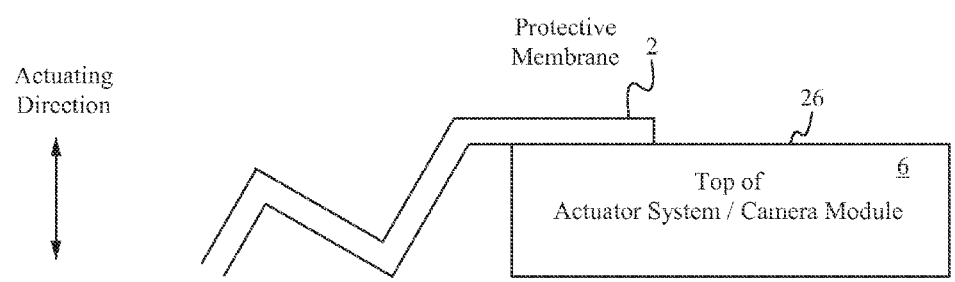
FIG. 5 illustrates a cut-out side view of an exemplary protective membrane having an extra length coupled to the surface of the actuator system according to an embodiment.

The protective membrane 2 is configured to enable movement of the lens system 4 relative to the actuator system 6, and in particular, relative to the surface 26 of the actuator system 6. To enable movement, in some embodiments, the protective membrane 2 is made of a elastic material that expands and contracts relative to the movement of the lens system 4 relative to the surface 26. In other embodiments, the protective membrane 2 is designed with extra width used as slack. FIG. 5 illustrates a cut-out side view of an exemplary protective membrane having an extra length coupled to the surface 26 of the actuator system 6 according to an embodiment. In the exemplary configuration of FIG. 5, the protective membrane 2 has a zig-zag profile. The extra width, for example, can fold inward when the lens system 4 moves closer to the surface 26 and can fold outward as the lens system 4 moves further away from the surface 26. In general, any shape that provides excessive width for accommodating relative movement of the lens system 4 relative to the actuator system 6 can be used. In still other embodiments, the protective membrane 2 can be configured to include a combination of elastic material and extra width. The protective membrane 2 can be made of a high porosity polytetrafluoroethylene (PTFE) or equivalent. It is understood that alternative materials can be used.

Figure 6:
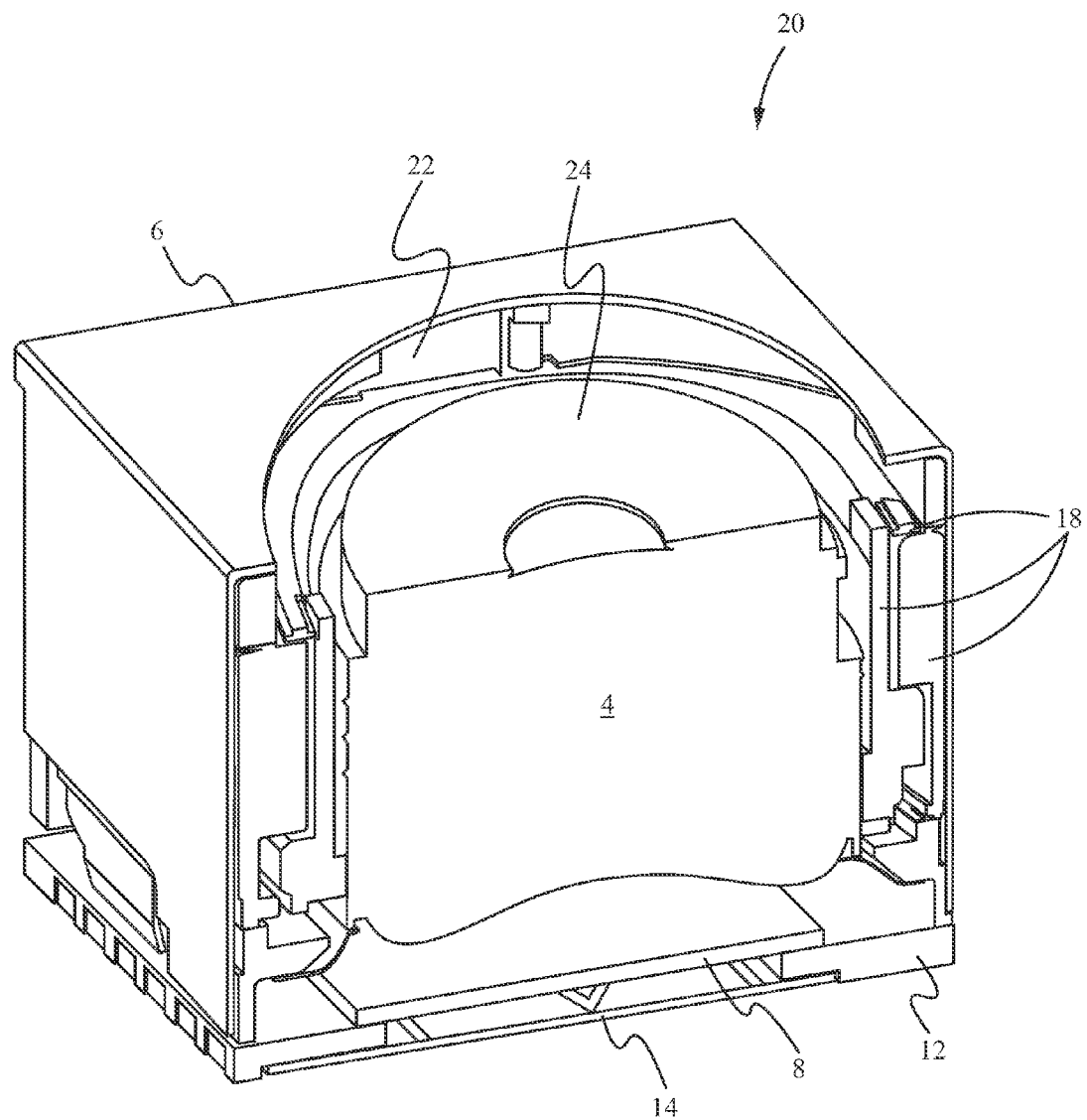
FIG. 6 illustrates a cut-out isometric view of an exemplary camera module including a camera contamination reduction apparatus according to another embodiment.
Figure 7:
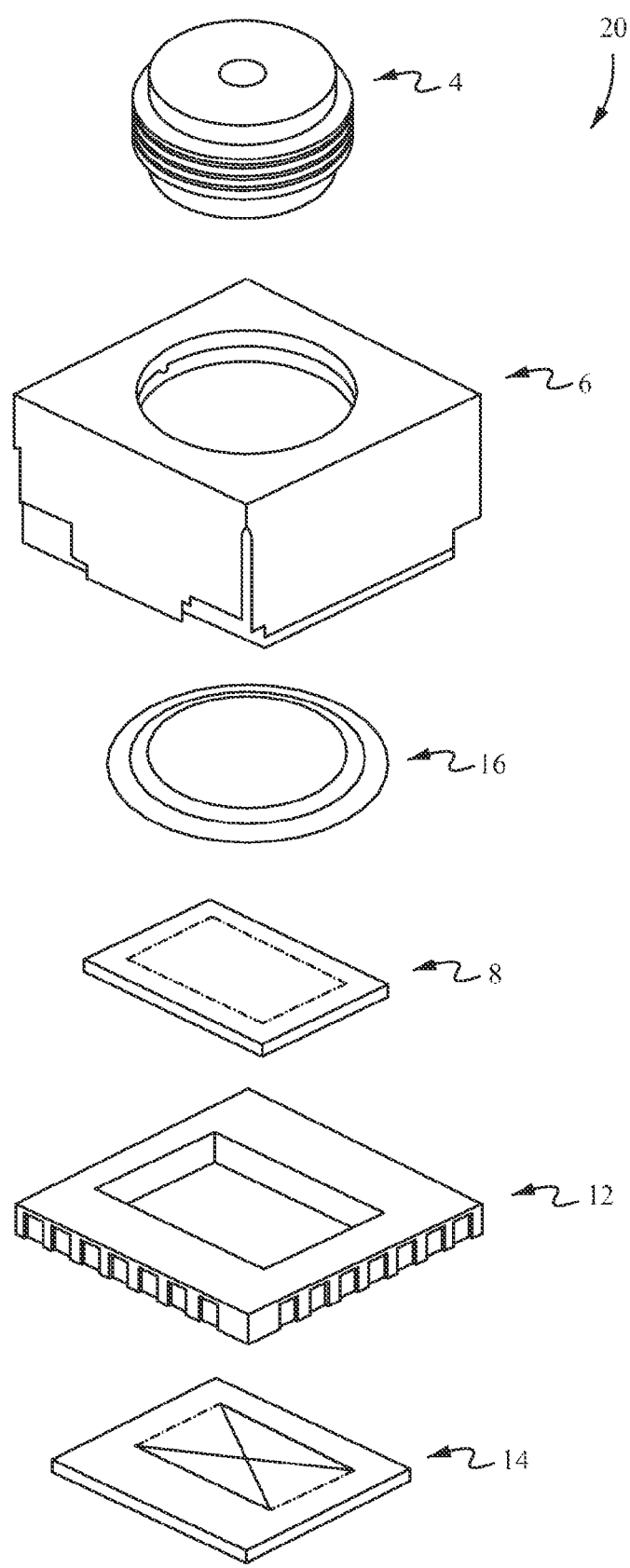
FIG. 7 illustrates an exploded view of the camera module of FIG. 6.

FIGS. 1-5 show the exemplary configuration having the protective membrane positioned at an entrance of the traveling paths proximate the external opening of the camera module at the first end of the lens system. In other embodiments, a protective membrane is positioned at alternative locations along the traveling path. FIG. 6 illustrates a cut-out isometric view of an exemplary camera module including a camera contamination reduction apparatus according to another embodiment. The camera module 20 shown in FIG. 6 is the same as the camera module 10 shown in FIGS. 1-5 except that the protective membrane 2 in camera module 10 is replaced by a protective membrane 16. FIG. 7 illustrates an exploded view of the camera module 20.

Figure 8:
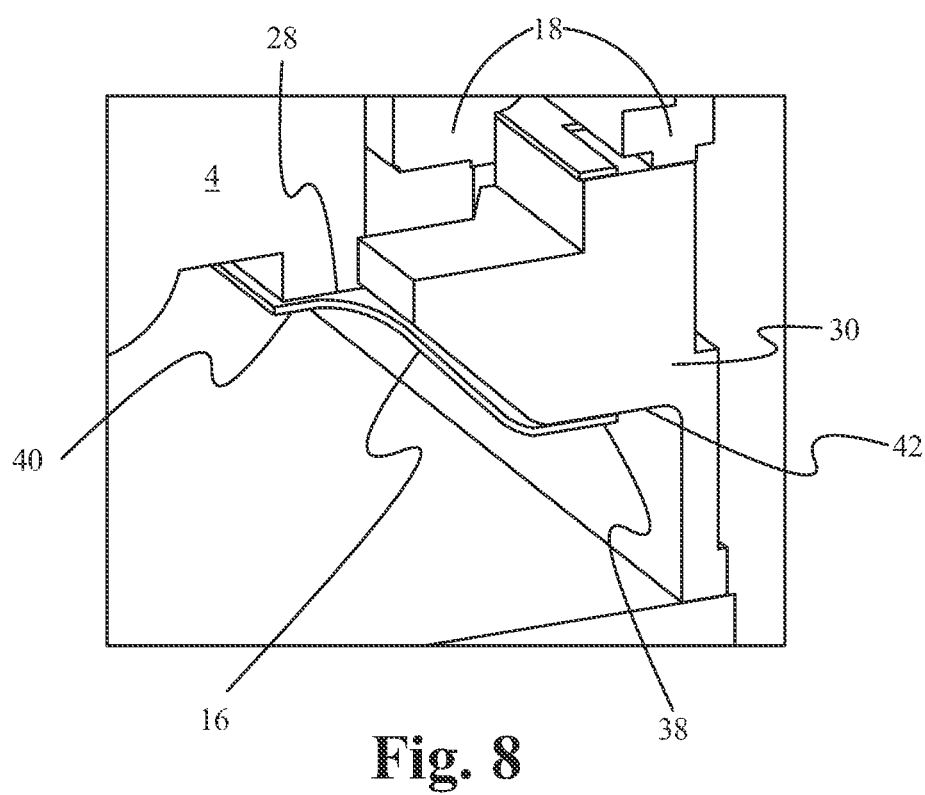
FIG. 8 illustrates a magnified portion of the interface between the protective membrane, the actuator system, and the lens system of FIG. 6.

As shown in FIG. 6, the protective membrane 16 is positioned internal the camera module 20. In particular, the protective membrane 16 is positioned nearer an end of the traveling path, which is more proximate to the image sensor 14 and the filter 8. In the exemplary embodiment shown in FIG. 6, the protective membrane 16 covers a perimeter gap between the second end 28 of the lens system 4 and a surface 42 of the support 30. FIG. 8 illustrates a magnified portion of the interface between the protective membrane 16, the actuator system 6, and the lens system 4 of FIG. 6. In particular, an outer portion 38 of the protective membrane 16 is coupled to the surface 42 of the support 30. An inner portion 40 of the protective membrane 16 is coupled to the second end 28 of the lens system 4. As shown in FIG. 8, the outer portion 38 of the protective membrane 16 overlaps a portion of the surface 42 of the support 30, and the inner portion 40 of the protective membrane 16 overlaps a portion of the second end 28 of the lens system 4 so as to substantially block the traveling paths within the camera module 10. The inner portion 40 does not cover any portion of a lens exposed at the second end 28 of the lens system 4.

The protective membrane 16 can also be similarly configured as the protective membrane 2, except that the protective membrane 16 is shaped and positioned according to the configuration of the second end 28 of the lens system 4, the support 30, and any gaps therebetween. In particular, the protective membrane 16 can be removably or permanently coupled to the surface 42 and to the second end 28. As shown in FIG. 8, the outer portion 38 of the protective membrane 16 overlays the surface 42, and the inner portion 40 of the protective membrane 16 overlays a bottom surface of the second end 28. In alternative configurations, the outer portion 38 can be coupled to a side surface of the support 30. Similarly, the inner portion 40 can be coupled to a side surface of the lens system 4. The outer portion 38 can be coupled to a surface of the actuator system 6 and the inner portion 40 can be coupled to a surface of the lens system 4 using any conventional method including, but not limited to, adhesives, clips, clamps, and screws. The second end 28 and/or the support 30 can be configured with an edge used for a tongue and groove joint with the protective membrane. Additionally, the protective membrane 16 is similarly configured as the protective membrane 2 to enable movement of the lens system 4 relative to the actuator system 6.

In the camera module 20 of FIGS. 6-8, the protective membrane 16 is positioned proximate an end of the traveling paths. This position does not prevent foreign material from entering the camera module through the opening 22, however the position of the protective membrane 16 in the camera module 20 does reduce, if not prevent, foreign material from reaching the sensitive optical components within the camera module 20, such as the filter 8 and the image sensor 14.

The camera modules 10 and 20 shown in FIGS. 1-8 illustrate the use of a single protective membrane. In other embodiments, a camera module can be configured with more than one protective membrane. For example, a camera module can be configured to include both the protective membrane 2 positioned as shown in FIGS. 1-5 and the protective membrane 16 positioned as shown in FIGS. 6-8. In still other embodiments, one or more protective membranes can be positioned to block the traveling paths at positions other than those indicated in FIGS. 1-8.

The camera contamination reduction apparatus has been described in terms of specific embodiments incorporating details to facilitate the understanding of the principles of construction and operation of the camera contamination reduction apparatus. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiment chosen for illustration without departing from the spirit and scope of the camera contamination reduction apparatus.

What is claimed is:

1. An imaging device comprising:
    a lens system comprising a first lens surface;
    an image sensor aligned to receive light from the lens system;
    an actuator system coupled to the first lens surface, wherein the actuator system is configured to move the first lens surface relative to the image sensor, further wherein the actuator system includes an opening aligned with the first lens surface such that the first lens surface is exposed to an external environment; and
    a protective membrane coupled to the first lens surface and to a second surface that is fixed relative to the image sensor, wherein the protective membrane is configured to filter particulates and to be expandable and contractible to accommodate movement of the first lens surface relative to the second surface.

2. The imaging device of claim 1 wherein the actuator system is configured to move the first lens surface relative to the image sensor and to the actuator system, and the protective membrane is configured to accommodate movement of the first lens surface relative to the image sensor and the actuator system.

3. The imaging device of claim 1 wherein the protective membrane is positioned to filter particulates entering through the opening of the actuator system.

4. The imaging device of claim 3 wherein the protective membrane is coupled to the actuator system around the opening of the actuator system.

5. The imaging device of claim 1 wherein the actuator system comprises actuating components that form a traveling path for particulates through the actuator system, further wherein the protective membrane is positioned to intersect and filter the traveling path.

6. The imaging device of claim 5 wherein the actuator system further comprises an actuator support structure onto which the actuating components are mounted and the lens system further comprises a second surface opposite the first surface, the actuator support structure includes an opening aligned with the second surface of the lens system such that the second surface is exposed to the image sensor.

7. The imaging device of claim 6 further comprising a second protective membrane, wherein the second protective membrane is coupled to the actuator system around the opening of the actuator support structure, and the second protective membrane is coupled to the second surface of the lens system.

8. The imaging device of claim 1 further comprising a substrate coupled between the actuator system and the image sensor, wherein the substrate includes a recessed portion within which the image sensor is positioned.

9. The imaging device of claim 8 further comprising a light filter coupled to the substrate and positioned between the lens system and the image sensor, wherein the protective membrane is positioned to filter particulates before the particulates reach the light filter.

10. The imaging device of claim 1 wherein the protective membrane comprises a porous material.

11. The imaging device of claim 1 wherein the protective membrane comprises an elastic material.

12. The imaging device of claim 1 wherein the protective membrane is configured according to a zig-zag profile.

13. The imaging device of claim 1 wherein the imaging device comprises an auto-focusing camera, a zoom-enabled camera, or an auto-focusing and zoom-enabled camera.

14. An imaging device comprising:
a lens system comprising a first lens surface;
an image sensor aligned to receive light from the lens system;
an actuator system coupled to the first lens surface, wherein the actuator system is configured to move the first lens surface relative to the image sensor, further wherein the actuator system includes an opening aligned with the first lens surface such that the first lens surface is exposed to an external environment; and
a protective membrane coupled to the first lens surface and to a second surface that is fixed relative to the image sensor, wherein the protective membrane is configured to filter particulates and to be movable to accommodate movement of the first lens surface relative to the second surface.

15. The imaging device of claim 14 wherein the actuator system is configured to move the first lens surface relative to the image sensor and to the actuator system, and the protective membrane is configured to accommodate movement of the first lens surface relative to the image sensor and the actuator system.

16. The imaging device of claim 14 wherein the protective membrane is positioned to filter particulates entering through the opening of the actuator system.

17. The imaging device of claim 16 wherein the protective membrane is coupled to the actuator system around the opening of the actuator system.

18. The imaging device of claim 14 wherein the actuator system comprises actuating components that form a traveling path for particulates through the actuator system, further wherein the protective membrane is positioned to intersect and filter the traveling path.

19. The imaging device of claim 18 wherein the actuator system further comprises an actuator support structure onto which the actuating components are mounted and the lens system further comprises a second surface opposite the first surface, the actuator support structure includes an opening aligned with the second surface of the lens system such that the second surface is exposed to the image sensor.

20. The imaging device of claim 19 further comprising a second protective membrane, wherein the second protective membrane is coupled to the actuator system around the opening of the actuator support structure, and the second protective membrane is coupled to the second surface of the lens system.

21. The imaging device of claim 14 further comprising a substrate coupled between the actuator system and the image sensor, wherein the substrate includes a recessed portion within which the image sensor is positioned.

22. The imaging device of claim 21 further comprising a light filter coupled to the substrate and positioned between the lens system and the image sensor, wherein the protective membrane is positioned to filter particulates before the particulates reach the light filter.

23. The imaging device of claim 14 wherein the protective membrane comprises a porous material.

24. The imaging device of claim 14 wherein the protective membrane comprises an elastic material.

25. The imaging device of claim 14 wherein the protective membrane is configured according to a zig-zag profile.

26. The imaging device of claim 14 wherein the imaging device comprises an auto-focusing camera, a zoom-enabled camera, or an auto-focusing and zoom-enabled camera.

* * * * *